(12) United States Patent
Kirrane et al.

(10) Patent No.: US 9,986,097 B2
(45) Date of Patent: May 29, 2018

(54) SYSTEM AND METHOD FOR SELECTING AN AGENT IN AN ENTERPRISE

(71) Applicant: Avaya Inc., Santa Clara, CA (US)

(72) Inventors: Desmond Kirrane, Galway (IE); Paul D'Arcy, Galway (IE); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 25 days.

(21) Appl. No.: 14/533,407

(22) Filed: Nov. 5, 2014

(65) Prior Publication Data

US 2016/0127556 A1 May 5, 2016

(51) Int. Cl.
*H04M 3/523* (2006.01)

(52) U.S. Cl.
CPC .. *H04M 3/5232* (2013.01); *H04M 2203/2038* (2013.01)

(58) Field of Classification Search
CPC .. H04M 3/5183; H04M 3/5233; H04M 3/523; H04M 3/5232; H04M 3/5191; H04M 2203/408; H04M 3/42068; H04M 3/5238; H04M 2203/402
USPC ........................................ 379/265.13, 266.07
See application file for complete search history.

(56) References Cited

U.S. PATENT DOCUMENTS

| | | | | |
|---|---|---|---|---|
| 5,657,383 A | * | 8/1997 | Gerber | H04M 3/48 379/210.01 |
| 6,064,730 A | * | 5/2000 | Ginsberg | H04M 7/0036 379/265.09 |
| 6,850,612 B2 | * | 2/2005 | Johnson | H04M 3/523 379/265.02 |

* cited by examiner

*Primary Examiner* — Ahmad F Matar
*Assistant Examiner* — Jirapon Intavong
(74) *Attorney, Agent, or Firm* — Stevens & Showalter, LLP (57) ABSTRACT

An agent selector computer system for selecting at least one agent for at least one communication session in an enterprise is disclosed. The agent selector computer system includes a monitoring module for monitoring one or more parameters of the at least one communication session. The agent selector computer system further includes an agent list generation module for generating at least one list of agents based on the one or more monitored parameters. The agent selector computer system further includes an agent selection module for receiving one or more agent selection inputs from at least one user to select at least one agent. The agent selector computer system further includes a routing module for routing the at least one communication session to the at least one selected agent.

20 Claims, 6 Drawing Sheets

SYSTEM AND METHOD FOR SELECTING AN AGENT IN AN ENTERPRISE

BACKGROUND

Field

Embodiments of the present invention generally relate to a system and method to provide customer service and particularly to a system and method for improving contact routing process in an enterprise.

Description of Related Art

Contact centers are employed by many enterprises to service, inbound and outbound contacts or customers. A primary objective of contact center management is to ultimately maximize contact center performance and profitability. An ongoing challenge in contact center administration is monitoring and optimizing contact center efficiency usage of its available resources. The contact center efficiency is generally measured by metrics such as Service Level Agreement (SLA), Customer Satisfaction (CSAT), and match rate. Contact center resources may include, agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within a specified period by the number accepted plus number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent in a queue over the same period. An agent with a primary skill level is one who typically may manage contacts of a certain nature more effectively and/or efficiently as compared to an agent of lesser skill level.

There are other contact center agents who may not be as proficient as the primary skill level agent, and those agents are identified either as skill level agents or backup skill level agents. As can be appreciated, contacts received by a primary skill level agent are typically managed more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when the KPIs are managed near, but not above, SLA threshold levels.

Throughput is a measure of the number of contacts/ contact requests or work requests that may be processed in a given amount of time. Agent utilization is a measure of how efficiently the agents' time is being used. Customer service level is a measure of the time customers spend waiting for their work to be managed. Company contact center customers wish to provide service to as many requests as possible in a given amount of time, using the least number of agents to do so, and minimizing the wait time for their customers that may increase the Service Level Agreement (SLA) of the contact center. Further, the contact center may also have to maintain the Customer Satisfaction (CSAT) metrics in order to maintain the KPIs of the contact center. For this purpose, agents may have to maintain the quality of services provided to the customers through multimedia (e.g., voice contacts, video contacts, emails, etc.).

Generally, when a customer contacts a contact center, for example, for a customer support service, a sales inquiry, etc., the contact is often automatically directed to an agent of the contact center. The contact is directed to an agent by prompting the customer to provide required attributes, such as a department, a skill, proficiency, and the like, that an agent must have in order to manage the contact appropriately.

In conventional techniques, a routing engine automatically selects an appropriate agent based on attributes received from a customer and then directs the customer to the selected agent. For example, a customer contacts a contact center to communicate with an agent of a credit card department to cancel a credit card then the contact center automatically directs the customer to an agent of the credit card department; however, there may be a possibility the agent may belong to a sales group of the credit card department. Further, if a contact is directed to an inappropriate agent, then the contact is redirected a couple of times before the contact is directed to an appropriate agent of the contact center. However, these techniques provide lack of flexibility in allowing customers to have significantly more choices and options in determining their view of an appropriate agent to satisfy their communication session.

There is thus a need for a system and method for selecting an appropriate agent to route a contact to the agent to improve a call routing process in an enterprise.

SUMMARY

Embodiments in accordance with the present invention provide an agent selector computer system for selecting at least one agent for at least one communication session in an enterprise. The agent selector computer system includes a monitoring module for monitoring one or more parameters of the at least one communication session. The system further includes an agent list generation module for generating at least one list of agents based on the one or more monitored parameters. The system further includes an agent selection module for receiving one or more agent selection inputs from at least one user to select at least one agent. The system further includes a routing module for routing the at least one communication session to the at least one selected agent.

Embodiments in accordance with the present invention further provide a computer-implemented method for selecting at least one agent for at least one communication session in an enterprise. The method includes monitoring one or more parameters of the at least one communication session; generating at least one list of agents based on the one or more monitored parameters; receiving one or more agent selection inputs from at least one user to select at least one agent; and routing the at least one communication session to the at least one selected agent.

Embodiments in accordance with the present invention further provide a computer-implemented method for selecting at least one agent for at least one communication session in an enterprise. The method includes monitoring one or more parameters of the at least communication session; generating at least one list of agents based on the one or more monitored parameters; displaying the at least one generated list of agents; receiving one or more agent selection inputs from at least one user to select at least one agent; and routing the at least one communication session to the at least one selected agent to provide customer service.

Embodiments of the present invention may provide a number of advantages depending on its particular configuration. First, embodiments of the present application provide a system and a method for selecting an agent for a communication session in an enterprise. Embodiments of the present application enable users of the enterprise to select an appropriate agent for a communication session. Next, embodiments of the present application provide real time analytical data of agents to the users of the enterprise. The analytical data may enable the users to select an appropriate agent for their communication session in the enterprise. Further, embodiments of the present application enable users to directly communicate with an agent of the enterprise, for example, through a social networking, mobile application, and the like.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1A:
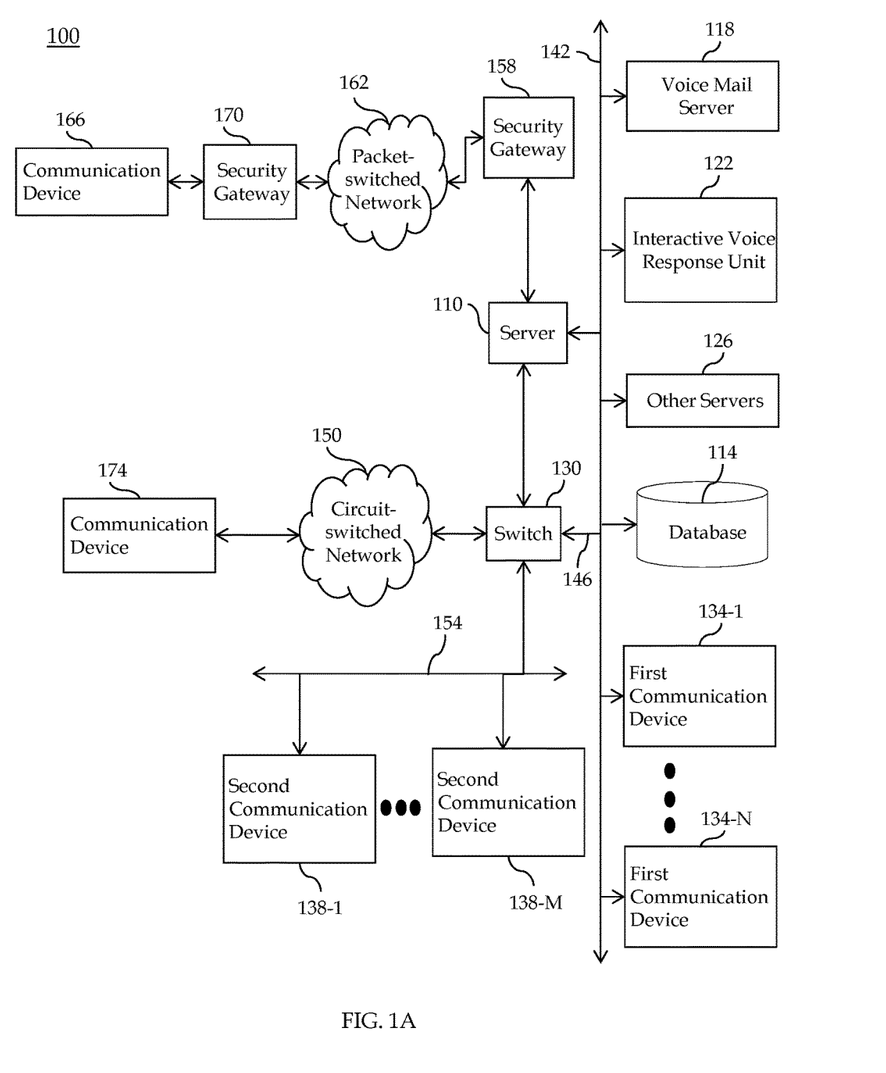
FIG. 1A illustrates a block diagram depicting a contact center, according to an embodiment of the present invention.

FIG. 1A shows an illustrative embodiment of the present invention. A contact center 100 comprises a server 110, a set of data stores or databases 114 containing contact or customer related information, resource or agent related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present invention, the customer and agent related information may be replicated over multiple repositories.

The servers may be connected via optional communication lines 146 to the switch 130. As will be appreciated, the other servers 126 may also include a scanner (which is normally not connected to the switch 130 or Web Server), Voice over Internet Protocol (VoIP) software, video call software, voice messaging software, an Internet Protocol (IP) voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya, or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted embodiments of the present invention do not require any particular type of information transport medium between switch, or server and first and second communication devices, i.e., embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
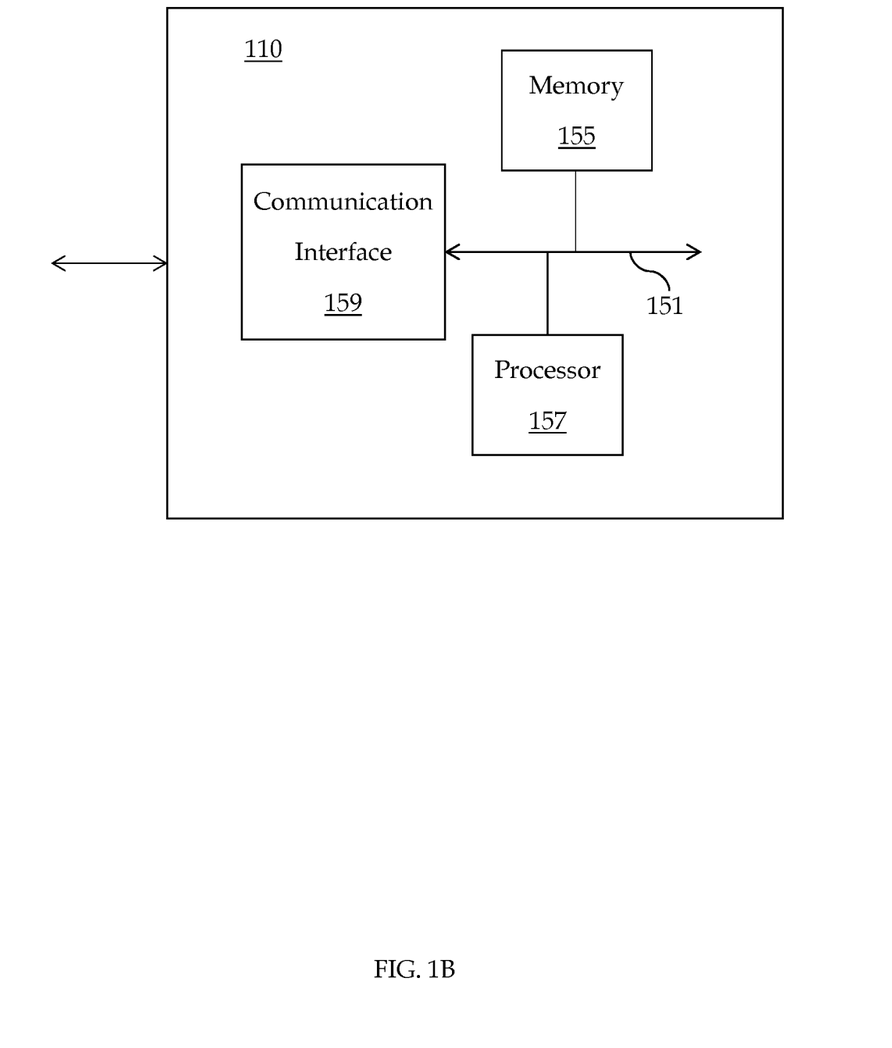
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present invention do not require the presence of packet- or circuit-switched networks.

Figure 2:
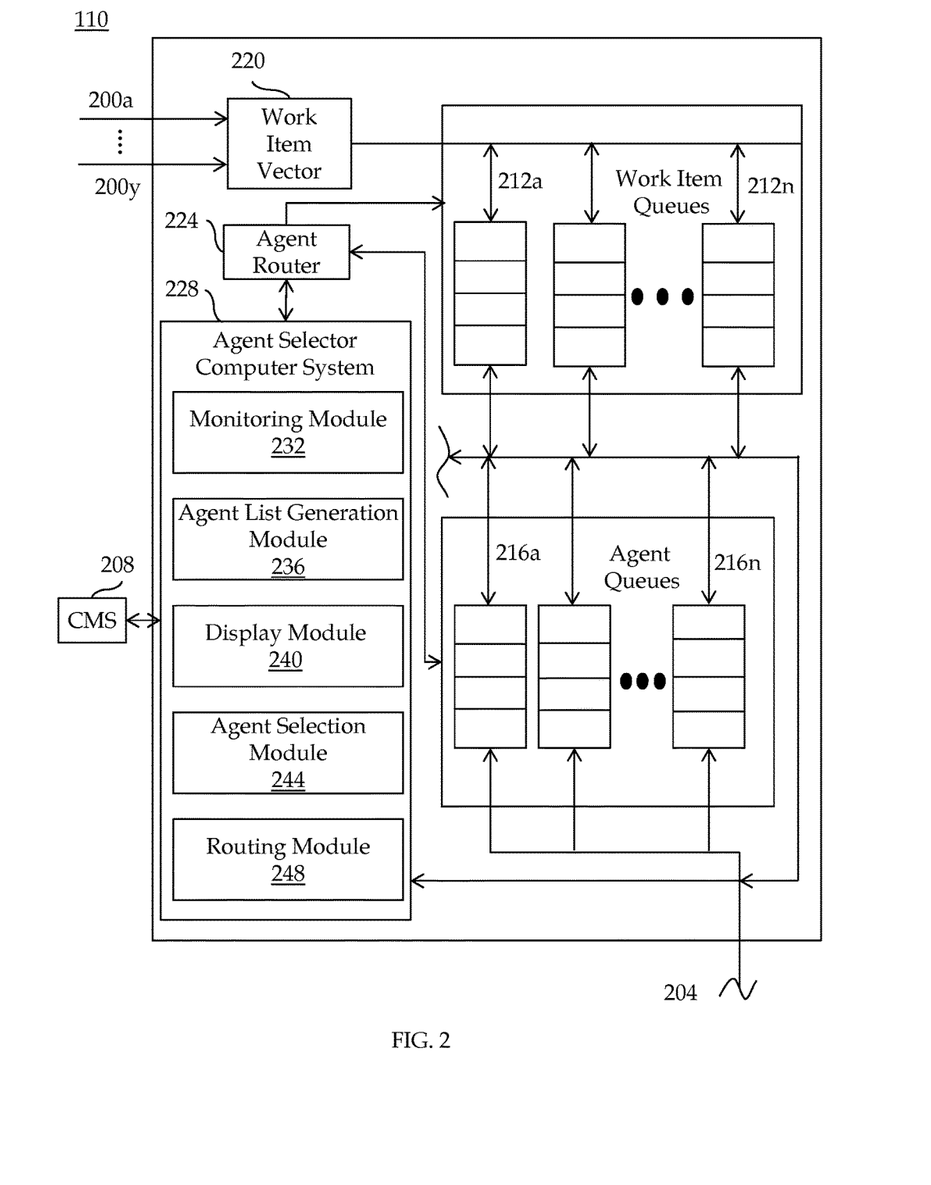
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200a-y (which may be one or more trunks, phone lines, etc.) and an agent communication line 204 (which may be a voice-and-data transmission line such as the LAN 142 and/or a circuit switched voice line). The server 110 may include Avaya Inc.'s Operational Analyst™ (OA) with On-Line Analytical Processing (OLAP) technology or a Call Management System (CMS) 208 that gathers contact records. OA and CMS will hereinafter be referred to jointly as the CMS 208.

As shown in FIG. 2, among the data stored in the server 110 is a set of contact or work item queues 212a-n and a separate set of agent queues 216a-n. Each work item queue 212a-n corresponds to a different set of agent queues, as does each agent queue 216a-n. Conventionally, contacts are prioritized and either are queued in individual ones of the contact queues 212a-n in their order of priority or are queued in different ones of a plurality of work item queues 212a-n that correspond to a different priority. Likewise, each agent's queues are prioritized according to his, or her level of expertise or skill in that queue, and agents are queued in either individual ones of agent queues 216a-n in their order of expertise level, or in different ones of a plurality of agent queues 216a-n that correspond to a queue and each one of which corresponds to a different expertise level. In an embodiment of the present invention, the agent queue 216a-n may be, but is not restricted to, a set of reserve agents queue in the contact center 100.

According to an embodiment of the present invention, included among the control programs in the server 110 is a work item vector 220. Contacts or work items incoming to the contact center 100 are assigned by the work item vector 220 to different work item queues 212a-n based upon a number of predetermined criteria, including a customer's identity, customer needs, contact center needs, current contact center queue lengths, a customer value, and an agent skill that is required for proper handling of the contact, and the like. Agents who are available for handling contacts are assigned to the agent queues 216a-n based upon the skills that they possess. An agent may have multiple skills, and hence may be assigned to multiple agent queues 216a-n simultaneously. Furthermore, an agent may have different levels of skill expertise (e.g., skill levels 1–N in one configuration or merely primary skill levels and secondary skill levels in another configuration), and hence may be assigned to different agent queues 216a-n at different expertise levels.

In one configuration, the contact center 100 is operated by a contract operator (e.g., a supervisor or a manager of the contact center 100), and each of the work item queues 212a-n, and possibly each of the agent queues 216a-n, corresponds to a different client. Each client may have a separate Service Level Agreement (SLA) or other type of performance measurement agreement with the contract operator regarding performance expectations, business goals, requirements or specifications for the client's respective queue(s).

Further, embodiments in accordance with the present invention may include, among the programs executing on the server 110, an agent router 224 and an agent selector computer system 228. The agent router 224 and the agent selector computer system 228 are stored either in the main memory or in a peripheral memory (e.g., disk, CD ROM, etc.) or some other computer-readable medium of the contact center 100. Further, the agent router 224 monitors the occupants of the work item and agent queues 212a-n and 216a-n, respectively, and contact center objectives, rules, and policies and route the work items of customers to agents of the contact center 100 in order to provide service to the work items.

The agent router 224 distributes and connects these work items to communication devices of available agents. When the agent router 224 forwards a contact (or first work item) to an agent, the agent router 224 also forwards customer-related information from the database 114 to the agent's desktop or computer work station for previewing and/or viewing (such as by a pop-up display) to enable the agent for providing better services to the customer. Depending on the contact center configuration, the agent router 224 may reallocate the work items to the agents of the contact center 100. The agents process the contacts or work items sent to them by the agent router 224.

In an embodiment of the present invention, the agent and their associated data are maintained and updated in the database 114 of the contact center 100. Upon the completion of handling a work item, a generator (not shown) collects selected metrics for the work item. These metrics may include, but is not restricted to, skills involved in servicing the work item, an identifier of a servicing agent, contact duration, a transaction or contact type (e.g., sale, information request, complaint, etc.), time-of-day, result of a contact (e.g., a type of sale, number of units sold, an average revenue generated, etc.), and so forth. The metrics along with other statistics is typically gathered by the CMS 208.

According to an embodiment of the present invention, the agent selector computer system 228 includes certain modules, such as, but is not restricted to, a monitoring module 232, an agent list generation module 236, a display module 240, an agent selection module 244, and a routing module 248. In some embodiments, one or more of the monitoring module 232, the agent list generation module 236, the display module 240, the agent selection module 244, and the routing module 248 may be implemented by one or more software processes running on the server 110. The server 110 may implement one or more software processes by use of the processor 157 being suitably programmed by use of software instructions stored in the memory 155 coupled to the processor 157.

The monitoring module 232 may monitor details of a communication session such as a type of the communication session to the contact center 100, according to an embodiment of the present invention. The type of the communication session, i.e., whether a communication session made by a customer is, but is not restricted to, a voice session, a video session, a text message, an email, an instant messaging, a Voice over Internet Protocol (VoIP), and so forth. Further, the monitoring module 232 may monitor static details about a communication session, for example, inputs selected by a customer in an IVR menu of the contact center 100. For example, if a customer selects a button "6" for a 'credit card' in an IVR menu and further selects a button "4" for an 'inquiry', then the monitoring module 232 may determine the customer desires to inquire about a credit card. Further, the monitoring module 232 may monitor context of the communication session, according to an embodiment of the present invention. The monitoring module 232 may monitor a communication session between a customer and an agent to monitor the context of the communication session, in an embodiment of the present invention. For example, while inquiring about the credit card, the customer desires to apply for the credit card at the same time.

Further, the monitoring module 232 may monitor a type of a customer, according to an embodiment of the present invention. In an exemplary scenario, a customer may be, but is not restricted to, a high priority or a gold customer, a medium priority customer, and/or a low priority or a silver customer. A high priority customer may be a customer having higher revenue products and/or services of the contact center 100. A medium priority customer may be a customer having medium revenue products and/or services of the contact center 100. Further, a low priority customer may be a customer having low revenue products and/or services of the contact center 100.

The monitoring module 232 may further extract keywords from the monitored parameters of the communication session, according to an embodiment of the present invention. In one exemplary scenario, the customer provides information that the customer desires to interact with an agent proficient in English and sales, and who is least occupied with work items, then "English", "sales", and "least occupied agent" may be extracted as keywords for the communication session. In an exemplary scenario, the monitoring module 232 may analyze text and extract keywords from a textual communication session such as an instant messaging, or an email, etc. If the type of the communication session is a voice session, then the monitoring module 232 may convert speech of the customer into text by a voice recognition module (not shown), which is then monitored to extract keywords for the communication session, in another exemplary scenario. In an embodiment of the present invention, the monitoring of the communication session may be carried out in a real time environment.

In an embodiment of the present invention, parameters of a communication session may include, but are not restricted to, a type of a communication session, a type of a customer, static details of a communication session, or a combination thereof.

The agent list generation module 236 may select a number of available agents from a pool of agents of the contact center 100 for the communication session. In an embodiment of the present invention, the agent may be, but is not included, a reserve agent, an agent, a trainee agent, a Subject Matter Expert (SME), a supervisor, a manager, and the like. In an exemplary scenario, an available agent may be, but is not restricted to, an idle agent, a least occupied agent, an agent who has not taken a contact for a longest time, and the like. In an embodiment of the present invention, the agent list generation module 236 may select a number of available agents from a pool of agents based on the monitored parameters of the communication session. For example, if monitored parameters of a communication session are "English", "sales" and "least idle agent" then agents having profiles that matches with the parameters of the communication session are selected. In another embodiment of the present invention, the agent list generation module 236 may select agents based on their occupancy. For example, a business goal of the contact center 100 is to assign an agent with a maximum of 80% of work load then agents who are available and are loaded with less than 80% of work items are selected, or if an agent just finishes handling of a contact then a break is provided to the agent and is not selected.

Further, the agent list generation module 236 may determine whether the monitored parameters of the communication session meet and/or satisfy business goals of the contact center 100. In an exemplary scenario, a business goal of the contact center 100 is to assign an agent with a maximum of 85% of work load and/or work items and to assign only web chats then the agent list generation module 236 may determine whether the business goal meets with the monitored parameters of the communication session and/or inputs received from the customer. If the required business goal is not met, then the agent list generation module 236 may select other available agents for the communication session.

The agent list generation module 236 may gather analytical data associated with the available agents of the contact center 100. In one embodiment of the present invention, the analytical data of a selected agent may include, but is not restricted to, a skill of an agent, a proficiency of an agent, occupancy of an agent, a rating of an agent, a spoken language of an agent, predicted wait time, throughput, a performance of an agent, an experience of an agent, and the like. In an exemplary scenario, the agent list generation module 236 may gather real time analytical data associated with a selected agent.

The agent list generation module 236 may further generate a list of agents, according to an embodiment of the present invention. The generated list may include, but is not restricted to, a name of an agent, real time analytical data of an agent, an email Identification (ID), a social network ID, a phone number, and the like, in an embodiment of the present invention. In an exemplary scenario, the list may display "agent 1" have attributes A, B, and C but has predicted wait time of four minutes, and an "agent 2" have attributes A, B, and D but has predicted wait time of three minutes, and an "agent 3" have attributes A, and D but has predicted wait time of 20 seconds, and the like.

The agent list generation module 236 may also generate a customized list of agents based on the type of a customer, according to an embodiment of the present invention. In an exemplary scenario, for a high priority customer, a list having higher rating and/or experienced agents is generated to maximize revenue of the contact center 100 whereas for a low priority customer, a list having lower rating agent, and/or a trainee of the contact center 100 is generated.

In another embodiment of the present invention, the agent list generation module 236 may generate a list of agents that may include, but is not restricted to, names of agents that may formerly have provided services to the customer. For example, if "Agent 1" has provided services to a customer and the customer calls the contact center 100 again then based on a communication history of the customer with the contact center 100 and the availability of the agent, name of the "Agent 1" is included in the list of agents.

The display module 240 may display the list of agents to the customer, according to an embodiment of the present invention. The list of agents may be displayed on an application provided by the contact center 100, in an embodiment of the present invention. In an exemplary scenario, the application may be installed in a user device associated with the customer. The user device may include, but is not restricted to, a computer, a laptop, a Personal Digital Assistance (PDA), a tablet, a smart phone, a palmtop, a notebook, and the like. It is also contemplated that the user device may support any type of user interface for supporting the presentment and/or exchanging of the list of agents and/or other data. In another embodiment of the present invention, the display module 240 may display the list of agents on a social media application that may be installed within a user device of a customer. In yet another embodiment of the present invention, the display module 240 may display the list of agents through, but is not restricted to, an email, a text message, an instant message, and the like. In an exemplary scenario, if a customer is on a video session then a list of agents is provided through an email, or a text message on a user device.

Further, the display module 240 may generate alerts for indicating the customer that an updated list of agents is available. Thereafter, the display module 240 may display the alerts on the user device. In an embodiment of the present invention, the alert may include, but is not restricted to, an audio alert, a video alert, or a combination thereof.

The agent selection module 244 may enable the customer to select an agent from the displayed list of agents, according to an embodiment of the present invention. In an exemplary scenario, if the customer desires to communicate with an agent proficient in "English" and "sales", then the customer may select an agent from a list of agents displayed on a user device having real time analytical data of available agents match with parameters, i.e., "English" and "sales", of the customer. Further, the agent selection module 244 may receive agent selection inputs from the customer, according to an embodiment of the present invention. For example, a customer may select "agent 5" as a most appropriate agent for the communication session by pressing a number "5" on a user device, then the input "5" is received as an agent selection input from the customer. Therefore, the agent selection module 244 may provide options to the customer to take a decision in selecting an appropriate agent for the communication session.

The routing module 248 may route the communication session to the agent selected by the customer. In an embodiment of the present invention, if the agent is currently available for the communication session, then a communication session is established between the customer and the agent selected by the customer. In another embodiment of the present invention, the customer is routed to a queue if the selected agent is currently handling another contact of the contact center 100.

Figure 3:
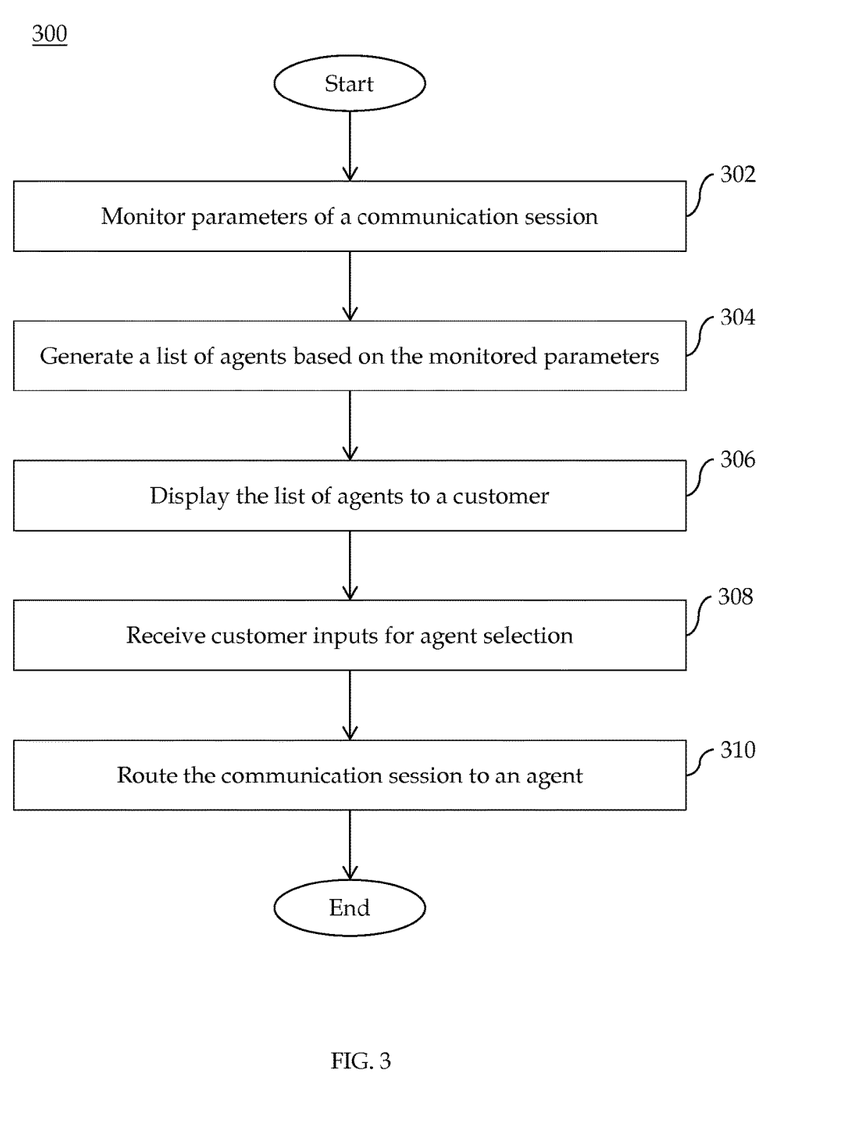
FIG. 3 depicts a flowchart of a method for selecting an agent for a communication session in a contact center, according to an embodiment of the present invention.

FIG. 3 depicts a flowchart of a method for selecting an agent for a communication session in a contact center 100, according to an embodiment of the present invention.

At step 302, an agent selector computer system 228 monitors parameters of a communication session. In an embodiment of the present invention, the parameters may include, but is not restricted to, a type of a communication session, a type of a customer, static details of a communication session, and the like. In an exemplary scenario, the type of the communication session is, i.e., whether a communication session made by a customer is, but is not restricted to, a voice session, a video session, a text message, an email, an instant messaging, a Voice over Internet Protocol (VoIP), and so forth.

Further, the agent selector computer system 228 monitor static details about the communication session, for example, inputs selected by the customer in an IVR menu of the contact center 100. Also, the agent selector computer system 228 monitors context of the communication session between the customer and an agent, according to an embodiment of the present invention. The agent selector computer system 228 also monitors a type of a customer, according to an embodiment of the present invention. In an exemplary scenario, a customer may be, but is not restricted to, a high priority or a gold customer, a medium priority customer, and/or a low priority or a silver customer. The agent selector computer system 228 further extracts keywords from the monitored parameters of the communication session, according to an embodiment of the present invention. In one exemplary scenario, the customer provides information that the customer desires to interact with an agent proficient in English and inquiry, and who is most proficient, then "English", "inquiry", and "most proficient agent" may be extracted as keywords for the communication session.

At step 304, the agent selector computer system 228 generates a list of agents, according to an embodiment of the present invention. The list of agents may be generated by selecting a number of available agents from a pool of agents of the contact center 100 based on the monitored parameters of the communication session, according to an embodiment of the present invention. For example, if monitored parameters of a communication session are "English", "sales" and "least idle agent" then agents having profiles that matches with the parameters of the communication session are selected.

The agent selector computer system 228 then gathers analytical data associated with the selected agents to generate the list of agents. In one embodiment of the present invention, the analytical data of a selected agent may include, but is not restricted to, a skill of an agent, a proficiency of an agent, occupancy of an agent, a rating of an agent, a spoken language of an agent, predicted wait time, throughput, a performance of an agent, an experience of an agent, and the like. In an exemplary scenario, the agent selector computer system 228 gathers real time analytical data associated with a selected agent.

The generated list may include, but is not restricted to, a name of an agent, real time analytical data of an agent, an email Identification (ID), a social network ID, a phone number, and the like, in an embodiment of the present invention. In an exemplary scenario, the list may display "Agent 1" have attributes A, B, and C but has predicted wait time of three minutes, and an "Agent 2" have attributes A, B, and D but has predicted wait time of two minutes, and an "Agent 3" have attributes A, and D but has predicted wait time of 45 seconds, and the like.

Next, at step 306, the agent selector computer system 228 displays the list of agents to the customer, according to an embodiment of the present invention. The list of agents may be displayed on an application provided by the contact center 100, in an embodiment of the present invention. In an exemplary scenario, the application may be installed in a user device associated with the customer. In another embodiment of the present invention, the agent selector computer system 228 displays the list of agents on a social media application. In an exemplary scenario, the social media application may be installed in a user device associated with the customer. In yet another embodiment of the present invention, the agent selector computer system 228 displays the list of agents through, an email, a text message, an instant message, and the like. In an exemplary scenario, if a customer is on an audio session then a list of agents is provided through a text message.

Thereafter, at step 308, the agent selector computer system 228 receives agent selection inputs from the customer. For example, a customer may select "agent 3" as a most appropriate agent for the communication session by pressing a number "3" on a user device, then the input "3" is received as an agent selection input from the customer. Further, the agent selector computer system 228 selects an agent corresponding to the received agent selection inputs from the customer.

Further, at step 310, the agent selector computer system 228 routes the communication session to the agent selected by the customer. In an embodiment of the present invention, if the agent is currently available for the communication session, then a communication session is established between the customer and the agent selected by the customer. In another embodiment of the present invention, the customer is routed to a queue if the selected agent is currently handling another contact of the contact center 100.

Figure 4A:
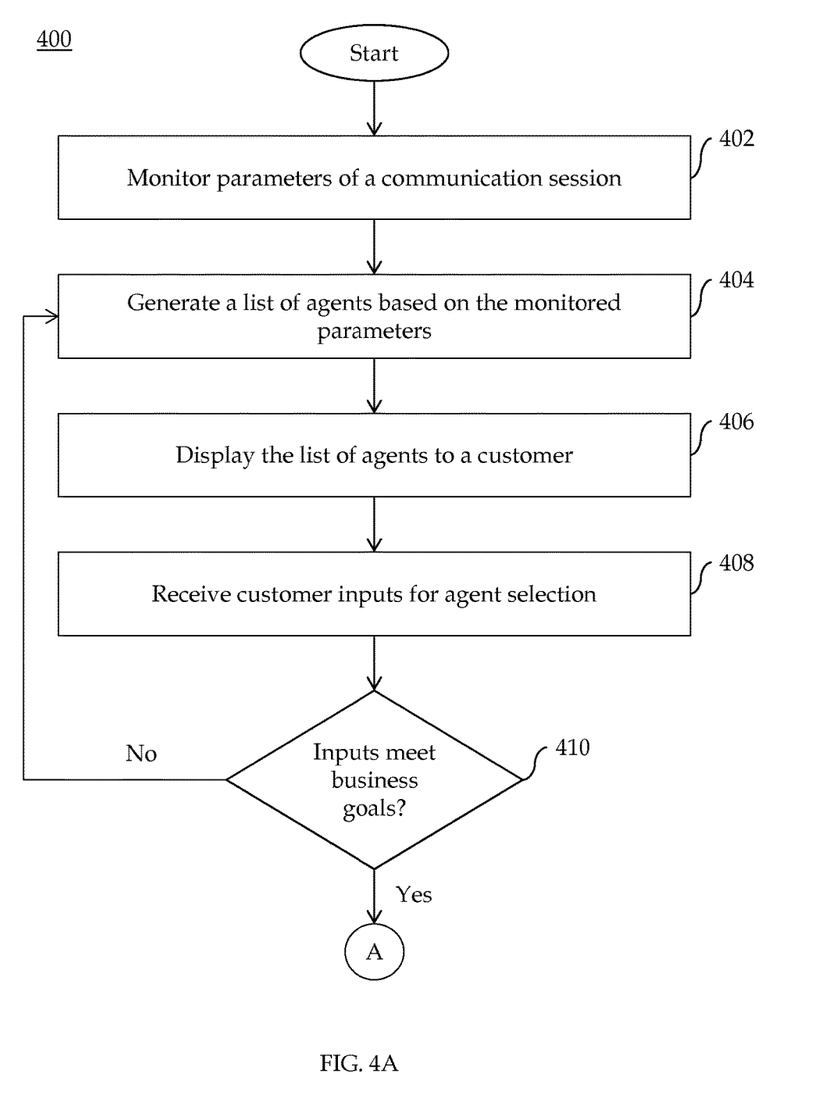
FIGS. 4A and 4B depict a flowchart of a method for selecting an agent for a communication session in a contact center, according to another embodiment of the present invention.
Figure 4B:
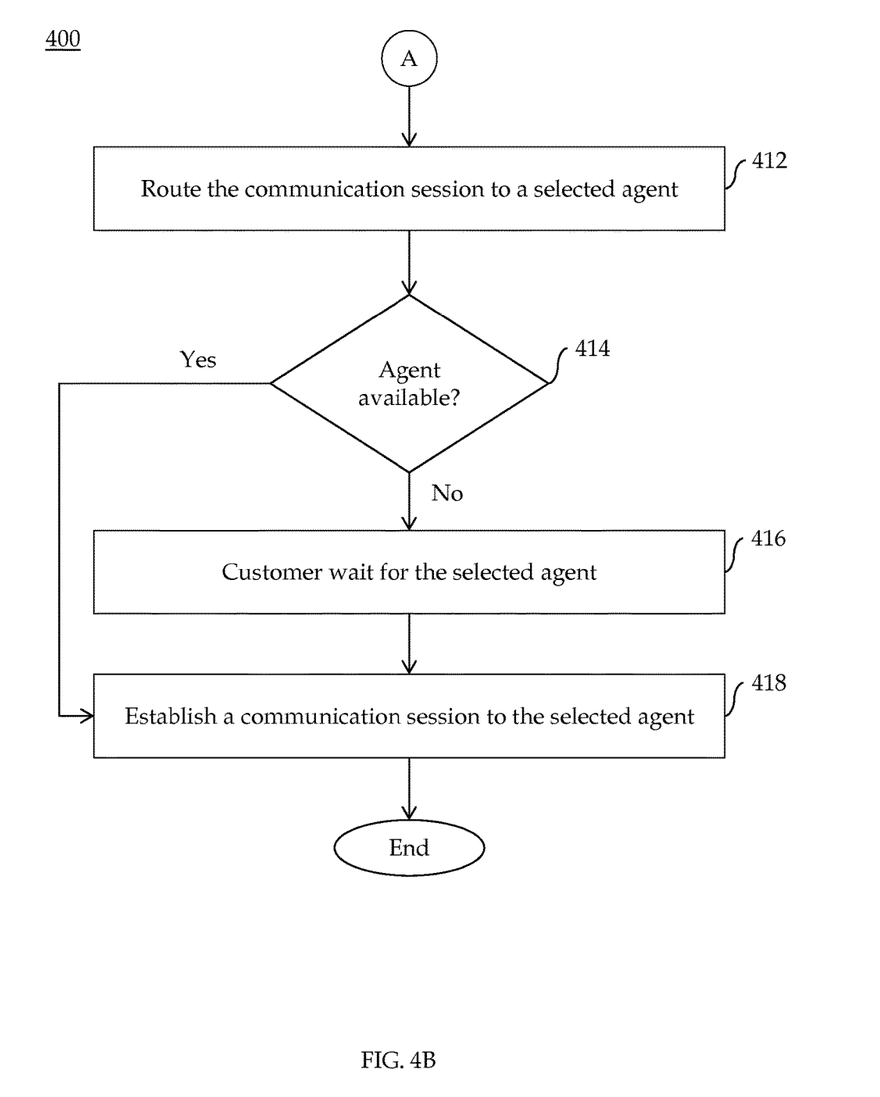

FIGS. 4A and 4B depict a flowchart of a method 400 for selecting an agent for a communication session in a contact center 100, according to another embodiment of the present invention.

At step 402, an agent selector computer system 228 monitors parameters of a communication session. In an embodiment of the present invention, the parameters may include, but is not restricted to, a type of a communication session, a type of a customer, static details of a communication session, and the like. In an exemplary scenario, the type of the communication session is, i.e., whether a communication session made by a customer is, but is not restricted to, a voice session, a video session, a text message, an email, an instant messaging, a Voice over Internet Protocol (VoIP), and so forth.

Further, the agent selector computer system 228 monitor static details about the communication session, for example, inputs selected by the customer in an IVR menu of the contact center 100. Also, the agent selector computer system 228 monitors context of the communication session between the customer and an agent, according to an embodiment of the present invention. The agent selector computer system 228 also monitors a type of a customer, according to an embodiment of the present invention. In an exemplary scenario, a customer may be, but is not restricted to, a high priority or a gold customer, a medium priority customer, and/or a low priority or a silver customer. The agent selector computer system 228 further extracts keywords from the monitored parameters of the communication session, according to an embodiment of the present invention. In one exemplary scenario, the customer provides information that the customer desires to interact with an agent proficient in English and inquiry, and who is most proficient, then "English", "inquiry", and "most proficient agent" may be extracted as keywords for the communication session.

At step 404, the agent selector computer system 228 generates a list of agents, according to an embodiment of the present invention. The list of agents may be generated by selecting a number of available agents from a pool of agents of the contact center 100 based on the monitored parameters of the communication session, according to an embodiment of the present invention. For example, if monitored parameters of a communication session are "English", "sales" and "least idle agent" then agents having profiles that matches with the parameters of the communication session are selected.

The agent selector computer system 228 then gathers analytical data associated with the selected agents to generate the list of agents. In one embodiment of the present invention, the analytical data of a selected agent may include, but is not restricted to, a skill of an agent, a proficiency of an agent, occupancy of an agent, a rating of an agent, a spoken language of an agent, predicted wait time, throughput, a performance of an agent, an experience of an agent, and the like. In an exemplary scenario, the agent selector computer system 228 gathers real time analytical data associated with a selected agent.

The generated list may include, but is not restricted to, a name of an agent, real time analytical data of an agent, an email Identification (ID), a social network ID, a phone number, and the like, in an embodiment of the present invention. In an exemplary scenario, the list may display "Agent 1" have attributes A, B, and C but has predicted wait time of three minutes, and an "Agent 2" have attributes A, B, and D but has predicted wait time of two minutes, and an "Agent 3" have attributes A, and D but has predicted wait time of 45 seconds, and the like.

Next, at step 406, the agent selector computer system 228 displays the list of agents to the customer, according to an embodiment of the present invention. The list of agents may be displayed on an application provided by the contact center 100, in an embodiment of the present invention. In an exemplary scenario, the application may be installed in a user device associated with the customer. In another embodiment of the present invention, the agent selector computer system 228 displays the list of agents on a social media application. In an exemplary scenario, the social media application may be installed in a user device associated with the customer. In yet another embodiment of the present invention, the agent selector computer system 228 displays the list of agents through, for example, but is not restricted to, an email, a text message, an instant message, and the like. In an exemplary scenario, if a customer is on an audio session then a list of agents is provided through a text message.

At step 408, the agent selector computer system 228 receives agent selection inputs from the customer to select an appropriate agent for the communication session, according to an embodiment of the present invention. For example, a customer may select "agent 3" as a most appropriate agent for the communication session by pressing a number "3" on a user device, then the input "3" is received as an agent selection input from the customer. Further, the agent selector computer system 228 selects an agent corresponding to the received agent selection inputs from the customer.

Thereafter, at step 410, the agent selector computer system 228 determines whether agent selection inputs meets business goals of the contact center 100. For example, business goal of the contact center 100 is to assign an agent with a maximum of 80% of work load and/or work items then it is determined that this business goal matches with received agent selection inputs. If it is determined that the agent selection inputs do not match business goals of the contact center 100 then the method 400 returns to the step 404 and the agent selector computer system 228 generates a new list of agents that may exclude name of agents having more than 80% of work load. Otherwise, the method 400 proceeds towards step 412.

Further, at step 412, the agent selector computer system 228 routes the communication session to the agent selected by the customer. Further, at step 414, the agent selector computer system 228 determines whether the selected agent is currently available for the communication session with the customer. If it is determined that the selected agent is available for the communication session, the method 400 proceeds towards step 418. Otherwise, the method 400 proceeds towards step 416.

At step 416, the agent selector computer system 228 routes the customer to a waiting queue to wait for the selected agent. As soon as the agent finishes a previously assigned contact, the customer is routed to the selected agent. Next, at step 418, the agent selection system 228 establishes a communication session between the customer and the agent selected by the customer.

In an exemplary scenario, an existing customer of a contact center may directly contact an agent of the contact center through an email rather than emailing on a generic support email address. Also, the customer may enter search criteria to create an on-the-fly address book with email addresses of most appropriate agents of the contact center. For example, if a customer is an existing customer of the contact center and desires to communicate with "Agent 1" then the customer may directly message the "Agent 1" on an associated email address "agent1@contactcenter.com".

In another exemplary scenario, a customer may raise a support ticket and assign a ticket to a specific agent. For example, a customer may assign a ticket to "Agent 5" of the contact center for a customer service associated with car insurance policy and may assign a ticket to "Agent 10" for Broadband related services.

In an exemplary scenario, a customer may use a hashtag to label a tweet on a social networking website. The hashtag may then be used to retrieve a list of agents of the contact center, which may be used to populate the @ mention symbol. For example, a customer may direct tweet an agent such as problem with #product123@agent456.

In a social networking site, a group is created where members of the group are agents having particular skills. A customer of the contact center may then post messages, for example, queries, comments, etc. to the group.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An agent selector computer system comprising a processor coupled to memory that includes program code to select an agent for routing a customer communication session in an enterprise, wherein the processor executes the program code to:
   monitor at least one parameter of the customer communication session;
   generate a list of agents based on the monitored at least one parameter;
   send the list of agents to a device associated with a customer;
   receive an agent selection input from the device associated with the customer, wherein the agent selection input identifies a selected agent from the list of agents;
   verify that the selected agent meets a goal of the enterprise associated with work loads of agents within the enterprise;
   route the customer communication session to the selected agent where the selected agent is verified to meet the goal of the enterprise; and
   execute, where the selected agent is not verified to meet the goal of the enterprise, program code to:
   generate a new list of agents based on the monitored at least one parameter and the goal of the enterprise;
   send the new list of agents to the device associated with the customer;
   receive a new agent selection input from the device associated with the customer, wherein the new agent selection input identifies a selected new agent from the new list of agents; and
   route the customer communication session to the selected new agent.

2. The system of claim 1, wherein the list of agents includes at least one of a reserve agent, an agent, a supervisor, or a Subject Matter Expert (SME).

3. The system of claim 1, wherein the program code to monitor at least one parameter further instructs the processor to extract a keyword from the monitored at least one parameter of the customer communication session.

4. The system of claim 1, wherein the program code to generate a list of agents further instructs the processor to select an available agent from a pool of a plurality of agents to be included in the list of agents.

5. The system of claim 4, wherein the program code to generate a list of agents further instructs the processor to gather analytical data associated with the available agent.

6. The system of claim 5, wherein the-program code to generate a list of agents further instructs the processor to gather the analytical data in real time.

7. The system of claim 1, wherein the program code to send the list of agents to a device associated with a customer further includes program code that instructs the processor to communicate the list of agents to a display device viewable by the customer.

8. The system of claim 7, wherein the program code that instructs the processor to communicate the list of agents to the display device further instructs the processor to generate at least one alert that is communicated to the user customer.

9. The system of claim 7, wherein the program code that instructs the processor to communicate the list of agents to the display device further instructs the processor to enable the customer to select at least one agent from the displayed list of agents.

10. A computer-implemented method for selecting an agent for routing a customer communication session in an enterprise, the method comprising:
    monitoring at least one parameter of the customer communication session;
    generating a list of agents based on the monitored at least one parameter;
    sending the list of agents to a device associated with a customer;
    receiving an agent selection input from the device associated with the customer, wherein the agent selection input identifies a selected agent from the list of agents;
    verifying that the selected agent meets a goal of the enterprise associated with work loads of agents within the enterprise;
    routing the customer communication session to the selected agent where the selected agent is verified to meet the goal of the enterprise; and
    performing, where the selected agent is not verified to meet the goal of the enterprise:
        generating a new list of agents based on the monitored at least one parameter and the goal of the enterprise;
        sending the new list of agents to the device associated with the customer;
        receiving a new agent selection input from the device associated with the customer, wherein the new agent selection input identifies a selected new agent from the new list of agents; and
        routing the customer communication session to the selected new agent.

11. The method of claim 10, wherein monitoring at least one parameter of the customer communication session further comprises extracting one or more keywords from a monitored context of the customer communication session.

12. The method of claim 10, wherein generating a list of agents further comprises selecting at least one available agent from a pool of a plurality of agents for the customer communication session.

13. The method of claim 12, wherein selecting at least one available agent from a pool of a plurality of agents further comprises gathering real time analytical data associated with the at least one available agent.

14. The method of claim 10, further comprising displaying the list of agents to the customer.

15. The method of claim 10, further comprising generating at least one alert for the customer.

16. A computer-implemented method for selecting an agent for routing a customer communication session in an enterprise, the method comprising:
    monitoring at least one parameter of the customer communication session;
    generating a list of agents based on the monitored at least one parameter;
    communicating a message to a display device for displaying the generated list of agents;
    receiving an agent selection input in response to communicating the message to the display device, wherein the agent selection input identifies a selected agent from the list of agents;
    verifying that the selected agent meets a goal of the enterprise associated with work loads of agents within the enterprise;
    routing the customer communication session to the selected agent where the selected agent is verified to meet the goal of the enterprise; and
    performing, where the selected agent is not verified to meet the goal of the enterprise:
        generating a new list of agents based on the monitored at least one parameter and the goal of the enterprise;
        sending the new list of agents to the device associated with the customer;
        receiving a new agent selection input from the device associated with the customer, wherein the new agent selection input identifies a selected new agent from the new list of agents; and
        routing the customer communication session to the selected new agent.

17. The method of claim 16, wherein generating a list of agents further comprises selecting at least one available agent from a pool of a plurality of agents for the customer communication session; and
    selecting at least one available agent from a pool of a plurality of agents further comprises gathering real time analytical data associated with the at least one available agent.

18. The method of claim 16, further comprising generating at least one alert that is communicated to a device of the customer.

19. The system of claim 1, wherein the program code further instructs the processor to:
    create an on-the-fly address book based on the generated list; and
    send an email to the selected agent based on the on-the-fly address book.

20. The method of claim 10, further comprising creating an on-the-fly address book based on the generated list;
    wherein routing the customer communication session to the selected agent further comprises sending an email to the selected agent based on the on-the-fly address book.

* * * * *